(12) United States Patent
Bitoh (10) Patent No.: US 7,887,967 B2
(45) Date of Patent: Feb. 15, 2011

(54) POWER SOURCE SYSTEM AND CONTROL METHOD THEREOF

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1214 days.

(21) Appl. No.: 11/325,221

(22) Filed: Jan. 3, 2006

(65) Prior Publication Data

US 2006/0154121 A1  Jul. 13, 2006

(30) Foreign Application Priority Data

Jan. 11, 2005  (JP)  .............................. 2005-003515

(51) Int. Cl.
*H01M 8/04* (2006.01)
*H01M 8/06* (2006.01)

(52) U.S. Cl. ...................... 429/440; 429/423; 429/430; 429/441

(58) Field of Classification Search ........................ None
See application file for complete search history.

(56) References Cited

U.S. PATENT DOCUMENTS

| | | | |
|---|---|---|---|
| 6,436,561 B1 | 8/2002 | Hart-Predmore et al. | |
| 6,555,989 B1 * | 4/2003 | Pearson ....................... | 320/101 |
| 2001/0014414 A1 | 8/2001 | Okamoto et al. | |
| 2003/0224230 A1 | 12/2003 | Stocker | |

FOREIGN PATENT DOCUMENTS

| | | |
|---|---|---|
| JP | 1-283773 A | 11/1989 |
| JP | 2001-176528 A | 6/2001 |
| JP | 2002-050377 A | 2/2002 |
| JP | 2003-229158 A | 8/2003 |

OTHER PUBLICATIONS

International Preliminary Report on Patentability, Chapter I of the Patent Cooperation Treaty, and Written Opinion of the International Searching Authority for PCT/JP2006/300321, dated Jul. 26, 2007. 9 sheets.

Japanese Office Action dated Sep. 3, 2009 and English translation thereof issued in a counterpart Japanese Application No. 2005-003515.

* cited by examiner

*Primary Examiner*—Jonathan Crepeau
(74) *Attorney, Agent, or Firm*—Holtz, Holtz, Goodman & Chick, PC (57) ABSTRACT

A power source system comprises: a chemical reaction unit producing a gas for power generation; a generator unit reacting a part of the gas for power generation to generate power, and ejecting unreacted part in the gas for power generation as an offgas; a heating apparatus provided in the chemical reaction unit setting the chemical reaction unit to a predetermined temperature by a heat quantity by a combustion reaction using a combustion component of the offgas and the fuel for combustion; and a controller calculating a quantity of the combustion component in the offgas to control a heat quantity generated by the heating apparatus in order to maintain the predetermined temperature of the chemical reaction unit according to a calculated change of the quantity of the combustion component in the offgas.

19 Claims, 4 Drawing Sheets

POWER SOURCE SYSTEM AND CONTROL METHOD THEREOF

CROSS-REFERENCE TO RELATED APPLICATIONS

This application is based upon and claims the benefit of priority from prior Japanese Patent Application No. 2005-003515, filed Jan. 11, 2005, the entire contents of which are incorporated herein by reference.

BACKGROUND OF THE INVENTION

1. Field of the Invention

The present invention relates to a power source system, a control apparatus of the power source system, and a control method of the power source system. More particularly, the present invention relates to a power source system, a control apparatus of the power source system, and a control method of the power source system, equipped with a fuel cell.

2. Description of the Related Art

In recent years, as an environmental problem and an energy problem have been getting popular, research and development which aim at putting a fuel cell, that have little influences on the environment (environmentally friendly), to practical use and at spreading the fuel cell have been vigorously performed. As a field to which a power source system using such fuel cell is applied, for example, a motor vehicle field can be cited. In the motor vehicle field, it has been required to put in practical use an electric vehicle using an electric motor as a drive unit in place of a gasoline engine and a diesel engine, and research and development for applying the power source system using the fuel cell as the power source unit to such electric vehicle have been vigorously performed. Consequently, the fuel cell is gradually being put in practical use and commercialized.

On the other hand, there have been demands to enhance the properties and extend period of operation time concerning portable type electronic equipment, which have been conventionally driven by a secondary battery, such as a personal digital assistant, a cellular phone, a digital still camera, a digital video camera, a portable television, a note-book size personal computer and the like. For such demands, research and development to miniaturize the power source system using such fuel cell as a power source unit that replaces the secondary battery have also been vigorously performed.

There is a fuel reforming type fuel cell as a fuel cell used for such a power source system. The fuel reforming type fuel cell is equipped with a chemical reaction unit such as a reformer for generating hydrogen by reforming a fuel for power generation containing a hydrocarbon compound through a chemical reaction of a catalytic reaction. In order to enhance the reaction in the chemical reaction unit efficiently, it is necessary to maintain the chemical reaction unit at a suitable predetermined temperature. As the method to maintain the chemical reaction unit at the predetermined temperature, for example, a configuration which supplies a required heat quantity using heat generation by a combustion component in the offgas ejected from a generator unit of a fuel cell and a fuel for combustion within catalyst combustor is known besides the heating by an electric heater.

However, when the output power of the generator unit of a fuel cell has changed or the temperature of the generator unit has changed according to the change in power requirement due to change in load, for example, the quantity of the combustion components in an offgas ejected from the generator unit changes, and leads to change in heat quantity by combustion heat due to the change of the quantity of the combustion components in the offgas.

Such change of the heat quantity is compensated by, for example, the combustion heat of the fuel for combustion, however, the catalyst combustor has a large time constant and a slow response to the injection of a fuel. Consequently, the compensation method has a problem in that it is difficult to stably control the temperature of the chemical reaction unit against a load change. Moreover, because it is difficult to control the temperature of the chemical reaction unit stably, the method also has another problem of a wasteful use of the fuel for burning.

SUMMARY OF THE INVENTION

The present invention, regarding a power source system which is equipped with a fuel cell, has an advantage of capability for providing a power source system and a control method that can control a temperature of a chemical reaction unit stably corresponding to a load change, as well as suppress wasteful use of fuel.

In order to achieve the aforementioned advantage, power source system of the present invention comprises: a chemical reaction unit receiving supply of fuel for power generation to produce a gas for power generation; a generator unit receiving supply of the gas for power generation, reacting a part of the gas for power generation to generate power, and ejecting unreacted part in the gas for power generation as an offgas; a heating apparatus provided in the chemical reaction unit, receiving supply of the offgas and a fuel for combustion, and setting the chemical reaction unit to a predetermined temperature by a heat quantity generated by a combustion reaction using a combustion component in the offgas and the fuel for combustion; a flow meter measuring a flow rate of the gas for power generation supplied to the generator unit; a calculator calculating the quantity of the combustion component in the offgas based on a value of a flow rate of the gas for power generation supplied to the generator unit, the value of the flow rate measured by the flow meter, and a value of power generated by the generator unit; and a controller controlling a heat quantity generated by the heating apparatus in order to maintain the predetermined temperature of the chemical reaction unit according to a change of the quantity of the combustion component in the offgas, the quantity calculated by the calculator. Here, the fuel for combustion is made of the fuel for power generation.

The heating apparatus comprises a first heating unit receiving the supply of the offgas to generate a heat quantity by a combustion reaction using the combustion component in the offgas, and a second heating unit receiving a supply of the fuel for combustion to generate a heat quantity by the combustion reaction of the combustion component in the fuel for combustion; and the control unit controls the heat quantity generated by the second heating unit according to the quantity of the combustion component in the offgas, the quantity calculated by the calculator.

The power source system further comprises an air quantity controller controlling an air quantity supplied to the generator unit, the chemical reaction unit and every unit requiring air introduction of the heating apparatus according to a change of the value of the power generated by the generator unit so that the air quantity is close to a bare minimum of quantity.

The fuel for power generation is a hydrocarbon material containing a hydrogen atom, and the chemical reaction unit is equipped with a reforming unit which at least generates a gas including a specific fuel component containing hydrogen as the gas for power generation from the fuel for power generation by a predetermined catalytic reaction. The chemical reaction unit may further be equipped with a by-product removing unit removing a by-product produced by the catalytic reaction.

The generator unit is equipped with a fuel cell generating power by an electrochemical reaction using the gas for power generation.

The calculator comprises a section for calculating a hydrogen quantity contained in the gas for power generation according to the value of the flow rate of the gas for power generation supplied to the generator unit, the value measured by the flow meter; and a section for calculating a quantity of the hydrogen in the offgas based on the calculated value of the hydrogen contained in the gas for power generation and a value of a hydrogen utilization rate according to a generated power in the generator unit.

The power source system further comprises a voltage converter converting output power of the generator unit into an output voltage to supply the output voltage to a load, and the generator unit controls a quantity of power generated according to a change of required power based on an operation state of the load. Additionally, the generator unit comprises a current measuring instrument measuring an output current value of the generator unit through the voltage converter or a converter converting an output of the voltage converter into an output current value of the generator unit, wherein the calculator calculates the quantity of the combustion component in the offgas based on a quantity of the flow rate of the gas for power generation measured by the flow meter and an output current value of the generator unit obtained by the current measuring instrument or the converter.

In order to achieve the aforementioned advantage, control apparatus of the present invention comprises: the power source system including at least: a chemical reaction unit receiving supply of fuel for power generation to produce a gas for power generation; a generator unit receiving the gas for power generation, reacting a part of the gas for power generation to generate power, and ejecting unreacted part in the gas for power generation as an offgas; and a heating apparatus receiving supply of the offgas and a fuel for combustion, and setting the chemical reaction unit to a predetermined temperature by a heat quantity generated by a combustion reaction using a combustion component in the offgas and the fuel for combustion, and the control apparatus comprising: a flow meter measuring a flow rate of the gas for power generation supplied to the generator unit; a calculator calculating the quantity of the combustion component in the offgas based on a value of a flow rate of the gas for power generation, the value of the flow rate measured by the flow meter, and a value of power generated by the generator unit; and a controller controlling a heat quantity generated by the heating apparatus in order to maintain a temperature of the chemical reaction unit according to a change of the quantity of the combustion component in the offgas, the quantity calculated by the calculator.

The fuel for power generation is a hydrocarbon material containing a hydrogen atom, and the calculator comprising: a section for calculating a quantity of hydrogen contained in the gas for power generation according to a value of the flow rate of the gas for power generation supplied to the generator unit; and a section for calculating a quantity of hydrogen in the offgas based on a calculated value of the hydrogen contained in the gas for power generation and a value of a hydrogen utilization rate according to a generated power in the generator unit.

The control apparatus further comprises an air quantity controller controlling an air quantity supplied to the generator unit, the chemical reaction unit and every unit requiring air introduction of the heating apparatus according to the value of the power generated by the generator unit so that the air quantity is close to a bare minimum of quantity.

In order to achieve the aforementioned advantage, a control method of a power source system, including the power source system composed of: a chemical reaction unit receiving supply of fuel for power generation to produce a gas for power generation; a generator unit receiving supply of the gas for power generation, reacting a part of the gas for power generation to generate power, and ejecting unreacted part in the gas for power generation as an offgas; and a heating apparatus receiving supply of the offgas and a fuel for combustion, and setting the chemical reaction unit to a predetermined temperature by a heat quantity generated by a combustion reaction using a combustion component in the offgas and the fuel for combustion, and the method comprising the steps of: calculating the quantity of the combustion component in the offgas based on a flow rate of the gas for power generation supplied to the generator unit, and a value of power generated by the generator unit; and controlling a heat quantity generated by the heating apparatus in order to maintain a temperature of the chemical reaction unit steady according to a change of the quantity of the combustion component in the offgas, the quantity calculated in a step to calculate the quantity of the combustion component in the offgas.

The step of calculating the quantity of the combustion component in the offgas comprises steps of: calculating a quantity of hydrogen contained in the gas for power generation according to a value of the flow rate of the gas for power generation supplied to the generator unit; and calculating a quantity of hydrogen in the offgas based on a value of a hydrogen utilization rate according to a generated power in the generator unit, and a calculated quantity of hydrogen contained in the gas for power generation.

The control method further comprises a step of controlling an air quantity supplied to the generator unit, the chemical reaction unit and every unit requiring air introduction of the heating apparatus according to the value of the power generated by the generator unit so that the air quantity is close to a bare minimum of quantity.

DETAILED DESCRIPTION OF THE PREFERRED EMBODIMENTS

Hereinafter, details of a power source system, a control apparatus of the power source system, and a control method of the power source system according to the present invention are described based on the embodiments shown in the drawings.

First Embodiment

First, a first embodiment of the power source system according to the present invention is described.

(1) Configuration

Figure 1:
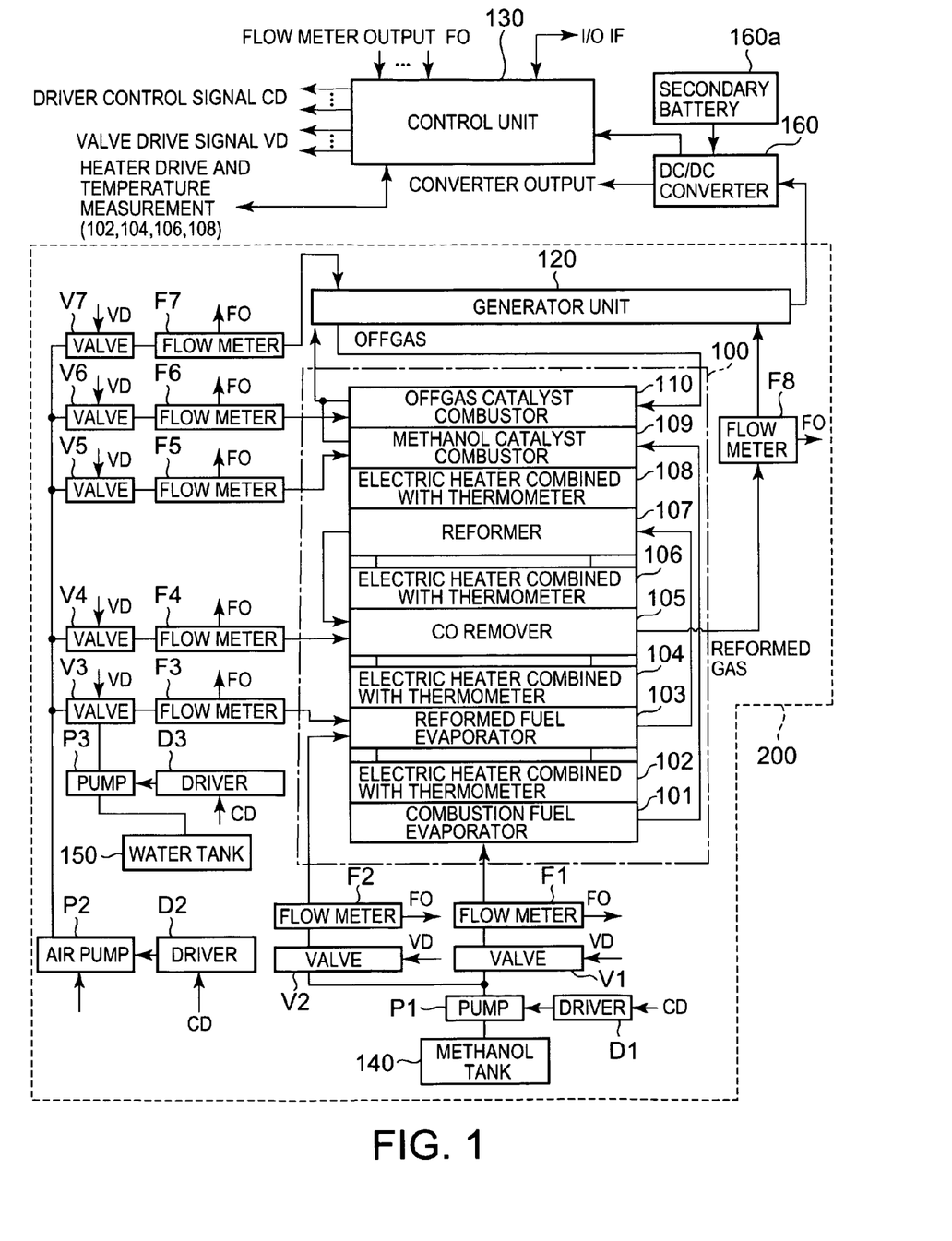
FIG. 1 is a block diagram showing the configuration of a power source system of a first embodiment according to the present invention.

FIG. 1 is a block diagram showing the configuration of the power source system of the first embodiment according to the present invention.

The power source system is composed of a control unit (control apparatus) 130, a DC/DC converter (voltage converter) 160 and a fuel cell system 200.

The fuel cell system 200 is equipped with a reactor unit 100 equipped with a chemical reaction unit, a generator unit (generator cell) 120, a methanol tank 140, a water tank 150, pumps P1-P3, drivers D1-D3, valves V1-V7, flow meters F1-F8 and the like.

The reactor unit 100 is composed of a combustion fuel evaporator 101, an electric heater and thermometer 102, a reformed fuel evaporator 103, an electric heater combined with thermometer 104, a CO remover (by-product removing unit) 105, an electric heater combined with thermometer 106, a reformer (reforming unit) 107, an electric heater combined with thermometer 108, a methanol catalyst combustor (heater: first heater) 109 and an offgas catalyst combustor (heater: second heater) 110. Here, the CO remover 105 and the reformer 107 constitute the chemical reaction unit.

The combustion fuel evaporator 101 evaporates the methanol (fuel for combustion) injected from the methanol tank 140 with the pump P1, and sends it out to the methanol catalyst combustor 109. The flow rate of the methanol injected into the combustion fuel evaporator 101 is adjusted by the valve V1, and is measured with the flow meter F1. The electric heater combined with thermometer 102 functions as an electric heater to heat the combustion fuel evaporator 101, and also functions as a thermometer to measure the temperature of the combustion fuel evaporator 101 by detecting the resistance of the combustion fuel evaporator 101.

The reformed fuel evaporator 103 evaporates the methanol (fuel for power generation) injected from the methanol tank 140 with the pump P1, and the water injected from the water tank 150 with the pump P3. The reformed fuel evaporator 103 sends the evaporated methanol and water out to the reformer 107. The flow rate of the methanol injected into the reformed fuel evaporator 103 is adjusted by the valve V2, and is measured with the flow meter F2. The flow rate of the water injected into the reformed fuel evaporator 103 is adjusted by the valve V3, and is measured with the flow meter F3. The electric heater combined with thermometer 104 functions as an electric heater to heat the reformed fuel evaporator 103, and also functions as a thermometer to measure the temperature of the reformed fuel evaporator 103 by detecting the resistance of the reformed fuel evaporator 103.

The reformer 107 generates a reformed gas (gas for power generation) containing hydrogen by a catalytic reaction of the evaporated water and the evaporated methanol supplied from the reformed fuel evaporator 103.

The CO remover 105 mixes the air introduced by the air pump P2 and the reformed gas generated by the reformer 107, removes the carbon monoxide as a by-product generated by the catalytic reaction of the reformer 107 from the reformed gas according to a selective oxidation reaction, and supplies the mixed gas to the generator unit 120. The air flow rate introduced into the CO remover 105 is adjusted by the valve V4, and is measured with the flow meter F4.

The electric heater combined with thermometer 106 functions as an electric heater to heat the CO remover 105, and also functions as a thermometer to measure the temperature of the CO remover 105 by detecting the resistance of the CO remover 105.

The electric heater combined with thermometer 108 functions as an electric heater to heat the reformer 107, and also functions as a thermometer to measure the temperature of the reformer 107 by detecting the resistance of the reformer 107.

The methanol catalyst combustor 109 mixes the evaporated fuel supplied from the combustion fuel evaporator 101 and the air introduced by the air pump P2, and performs catalytic combustion of the mixed gas to heat the chemical reaction unit of the reactor unit 100 with the combustion heat. The air flow rate introduced into the methanol catalyst combustor 109 is adjusted by the valve V5, and is measured with the flow meter F5.

The offgas catalyst combustor 110 mixes the offgas (unreacted reformed gas containing hydrogen) ejected from the generator unit 120 and the air introduced with an air pump P2, and performs catalytic combustion of the mixed gas to heat the whole reaction unit 100 by the combustion heat. The air flow rate introduced into the offgas catalyst combustor 110 is adjusted by the valve V6, and is measured with the flow meter F6. Incidentally, although the present embodiment is configured so as to supply methanol from the methanol tank 140 to the reformed fuel evaporator 103 and the combustion fuel evaporator 101, and a part of the fuel for power generation is used as a fuel for combustion, the present invention is not limited to such configuration. The fuel for combustion may be supplied from another dedicated tank. Moreover, the fuel for power generation and the fuel for burning may be made of different materials.

The generator unit 120 has one or a plurality of generator cell structures, each including a fuel electrode formed on one surface of an electrolyte film MEA and an air electrode formed on the other surface, and generates electric power by an electrochemical reaction of hydrogen, which is supplied to the fuel electrode and is contained in the reformed gas supplied from the CO remover 105 after removing CO, and oxygen in the air supplied to the air electrode is introduced by the air pump P2. Moreover, the generator unit 120 supplies unreacted reformed gas, which has not been used for the electrochemical reaction, to the offgas catalyst combustor 110. The flow rate of the reformed gas supplied to the generator unit 120 after removing CO is measured with the flow meter F8.

The DC/DC converter 160 receives the supply of the electric power generated by the generator unit 120, and is connected to a load such as electric equipment and the like. The DC/DC converter 160 generates an output voltage of a predetermined voltage based on the electric power supplied from the generator unit 120, and supplies the output voltage to the load. The DC/DC converter 160 includes a secondary battery 160a holding at least a part of the electric power generated by the generator unit 120. For example, at the time of starting the system, at the time of an overload, or the like, the DC/DC converter 160 generates the output of the predetermined voltage with the stored power of the secondary battery 160a. At the time of the stationary operation of the system, the DC/DC converter 160 performs switching regulation of the output power of the generator unit 120 to a constant voltage and supply it to an external load, as well as charge the secondary battery 160a. Here, the electric power generated by the generator unit 120 is suitably adjusted according to the changes (load changes) of the requested power based on the operation state of the load connected through the DC/DC converter 160. Moreover, the DC/DC converter 160 may be equipped with a configuration (current measuring instrument) measuring the output current value Ico of the generator unit 120 through the DC/DC converter 160 directly, or may be equipped with the configuration (converter) converting the output of the DC/DC converter 160 into the output current value Ico of the generator unit 120.

The control unit 130 is equipped with a CPU, a ROM, a RAM, an A/D converter, a D/A converter, and the like, and controls the operation of each unit of the system. Specifically, the CPU executes various control programs stored in ROM and the like, and controls so that the reactor unit 100 is in the predetermined operation state. For example, the output FO of each unit flow meters F1-F8 described above, temperature measurement value of the electric heater combined with thermometers 102, 104, 106 and 108, and the like are obtained by means such as A/D conversion, as well as output current value Ico of the generator unit 120 is obtained through the DC/DC converter 160 by means such as A/D conversion. Subsequently, according to the values obtained, valve drive signals VD driving the valves V1-V7 of each unit described above, driver control signals CD controlling the drivers D1-D3 driving the pumps P1-P3, heater drive signals of the electric heaters and thermometers 102, 104, 106 and 108, and the like are generated by the CPU to control so that the reactor unit 100 is in the predetermined operation state. Incidentally, the control program stored in the ROM of the control unit 130 and the like includes offgas control processing and air quantity control processing in each embodiment, both of which will be described later.

Moreover, table data used for the offgas control processing, which will be described later, is stored in the ROM of the control unit 130.

(2) Operation

Next, the operation of the offgas control processing executed by the control unit 130 is described as the operation of the power source system in the configuration described above.

Figure 2:
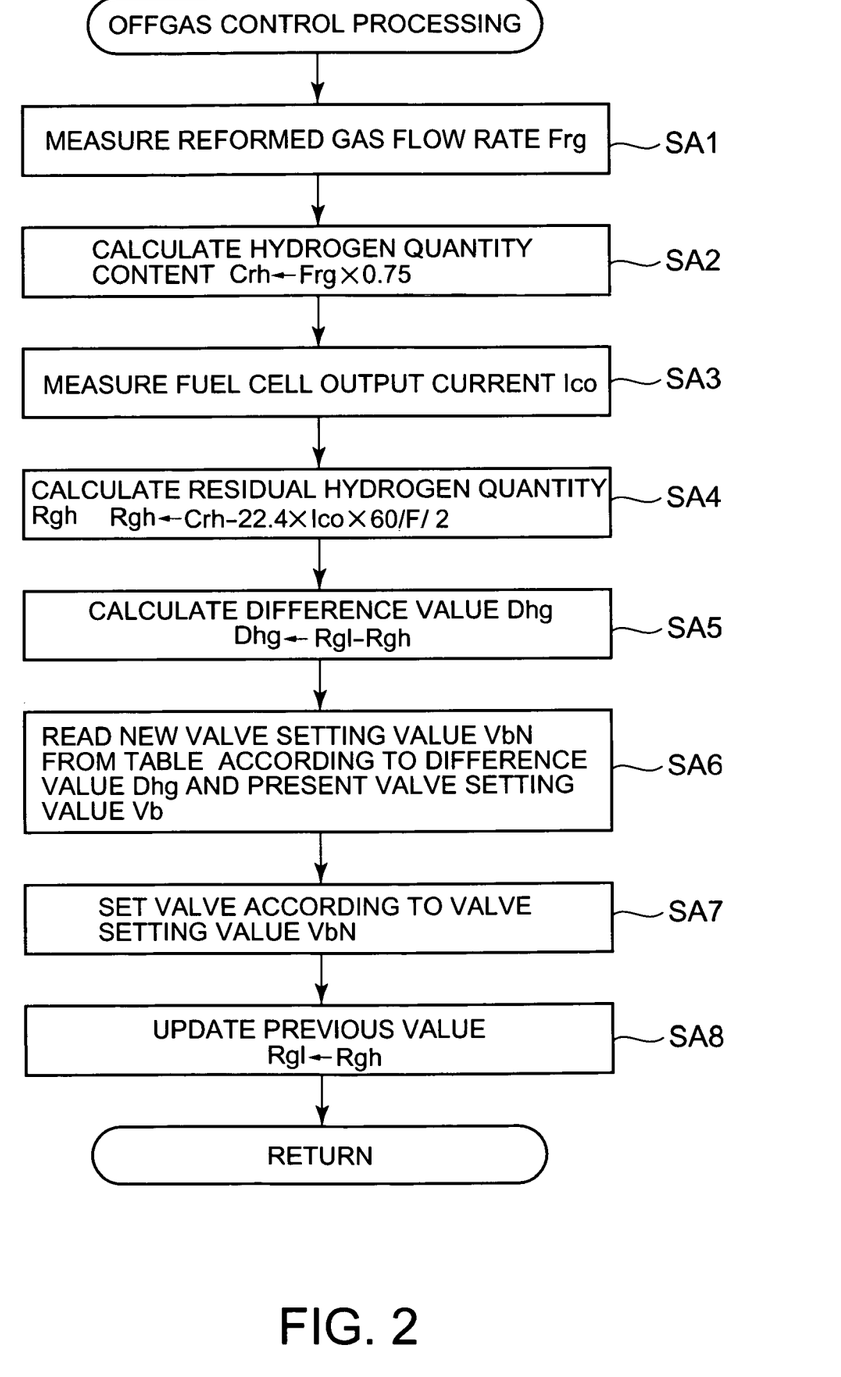
FIG. 2 is a flowchart showing the operation of the offgas control processing in the present embodiment.

FIG. 2 is a flowchart showing the operation of the offgas control processing of the present embodiment.

The offgas control processing shown in FIG. 2 is executed by an interruption at every predetermined time, for example, by the timer interrupter by CPU of the control unit 130.

First, at interruption execution timing, the CPU of the control unit 130 executes the program of the offgas control processing stored in the ROM or the like, and proceeds the processing to Step SA1 shown in FIG. 2 to measure a reformed gas flow rate Frg supplied from the CO remover 105 to the generator unit 120. The reformed gas flow rate Frg is measured by an output FO of the flow meter F8.

Subsequently, in Step SA2, a hydrogen quantity content Crh in the reformed gas is calculated from a measured reformed gas flow rate Frg. Here, in the case the reformed gas was produced by reforming methanol through a steam reform reaction, it is known that the hydrogen contained in the reformed gas is about 75%, and the remaining 25% of the reformed gas is carbon dioxide. Therefore, the hydrogen quantity content Crh can be calculated from reformed gas flow rate Frg×0.75. The calculated value is stored in a register Crh.

Subsequently, in Step SA3, the output current value Ico of the generator unit 120 is directly measured from the DC/DC converter 160 with a current measuring instrument, or the output current value Ico of the generator unit 120 is obtained by converting the output of the DC/DC converter 160 with a converter, and the value of the output current value Ico is stored in a register Ico.

Next, the processing proceeds to Step SA4. Here, the quantity of the hydrogen consumed by the electrochemical reaction for power generation by the generator unit 120 is proportional to the value of an output current. When the value of the output current is Ico, it is known that the quantity of the hydrogen consumed in the generator unit 120 Cgh can be calculated by formula (1). Therefore the residual hydrogen quantity in the offgas Rgh can be obtained by subtracting the hydrogen quantity consumed in the generator unit 120 Cgh from the hydrogen quantity content Crh of the reformed gas. That is, by assigning the output current Ico of the generator unit 120 stored in the register Ico into the following formula (1), the hydrogen quantity consumed in the generator unit 120 Cgh is calculated. Successively, as shown in a formula (2), the hydrogen quantity consumed in the generator unit 120 Cgh calculated by the formula (1), is substracted from the hydrogen quantity content Crh of the reformed gas, and the residual hydrogen quantity in the offgas Rgh is calculated. The calculated value is stored in a register Rgh.

$$Cgh = 22.4 \times Ico \times 60/F/2 \quad (1)$$

$$Rgh = Cr - Cgh \quad (2)$$

Here, in the formula (1), 22.4[L]×Ico[A]×60[sec]/F/2 represents a hydrogen consumption quantity, and F represents the Faraday constant (96485.3415 [C/mol]).

When the residual hydrogen quantity in the offgas Rgh is obtained in this way, the processing proceeds to Step SA5. Here, it is supposed that the residual hydrogen quantity calculated in the previous time is stored in a resister Rgl. Then, by subtracting a residual hydrogen quantity Rgh, which is calculated this time and stored in a register Rgh, from the previous residual hydrogen quantity Rgl, a difference value Dhg of the residual hydrogen quantity in the offgas from the previous time to this time is calculated and the difference value Dhg is stored into a register Dhg.

Next, in Step SA 6, the difference value Dhg of the residual hydrogen quantity in the offgas stored in the register Dhg, and the present setting value V1$b$ of the valve V1 adjusting the quantity of the methanol supplied to the methanol catalyst combustor 109 through the combustion fuel evaporator 101 is read out. Then a new setting value V1$b$N of the valve V1 is read out from a methanol quantity adjusting valve setting table T1 stored in the ROM of the control unit 130, by using the difference value Dhg and the setting value V1$b$ as addresses.

Here, the methanol quantity adjusting valve setting table T1 is a table in which the values of suitable setting values V1$b$N, obtained by experiments, of the valve V1 are saved, which values are necessary for controlling the heating value of the methanol catalyst combustor 109 so as to maintain the temperature of the reactor unit 100 to be constant, regarding various combinations of each value, when the difference value Dhg of the residual hydrogen quantity in the offgas takes various values to each value of the various setting value V1$b$ of the valve V1.

Subsequently, in Step SA7, the valve drive signal VD is generated corresponding to the new setting value V1$b$N, which has been read out in Step SA6 mentioned above, and supplied to the valve V1.

Thereby, the valve V1 adjusts the quantity of the methanol supplied to the methanol catalyst combustor 109 through the combustion fuel evaporator 101 according to the new setting value V1$b$N. That is, the opening and closing control of the valve V1 according to the setting value V1bN is performed so that the difference value Dhg becomes "0." For example, when the residual hydrogen quantity Rgh increases and the heating value of the offgas catalyst combustor 110 increases, the CPU closes the valve V1 so as to decrease the quantity of the methanol supplied to the combustion fuel evaporator 101 to offset the increase of the heating value. On the other hand, when the residual hydrogen quantity Rgh decreases and the heating value of the offgas catalyst combustor 110 decreases, the CPU controls to open the valve V1 to increase the quantity of the methanol supplied to the combustion fuel evaporator 101 so as to compensate the decrease in the heating value.

Subsequently, the processing proceeds to Step SA8, and stores the value of the register Rgh into the resister Rgl. Then, the residual hydrogen quantity Rgh calculated this time is updated as the previous value Rgl, and ends the processing.

By repeatedly executing the offgas control processing described above approximately 1-20 times/sec by the timer interrupter for example, the heating value of the methanol catalyst combustor 109 is increased or decreased by adjusting the quantity of the methanol (fuel for combustion) which is supplied to the burning fuel evaporator 101 to follow the residual hydrogen quantity Rgh in the offgas which changes every moment. Consequently, it becomes possible to control the temperature of the reformer unit to maintain the temperature stably, corresponding to load changes.

Moreover, it also becomes possible to suppress the wasteful use of the methanol (fuel for combustion) in the methanol catalyst combustor 109 by controlling the heating value of the methanol catalyst combustor 109 appropriately.

Second Embodiment

Next, a second embodiment of the power source system according to the present invention is described.

Since the configuration of the second embodiment is almost the same as that of the first embodiment shown in FIG. 1, detailed description of the configuration is omitted.

The second embodiment is different from the first embodiment described above in that the quantity of air supplied to each unit of the fuel cell system 200 (the CO remover 105, the methanol catalyst combustor 109, the offgas catalyst combustor 110, and the generator unit 120) which needs air introduction, is controlled according to the output current Ico of the generator unit 120.

Figure 3:
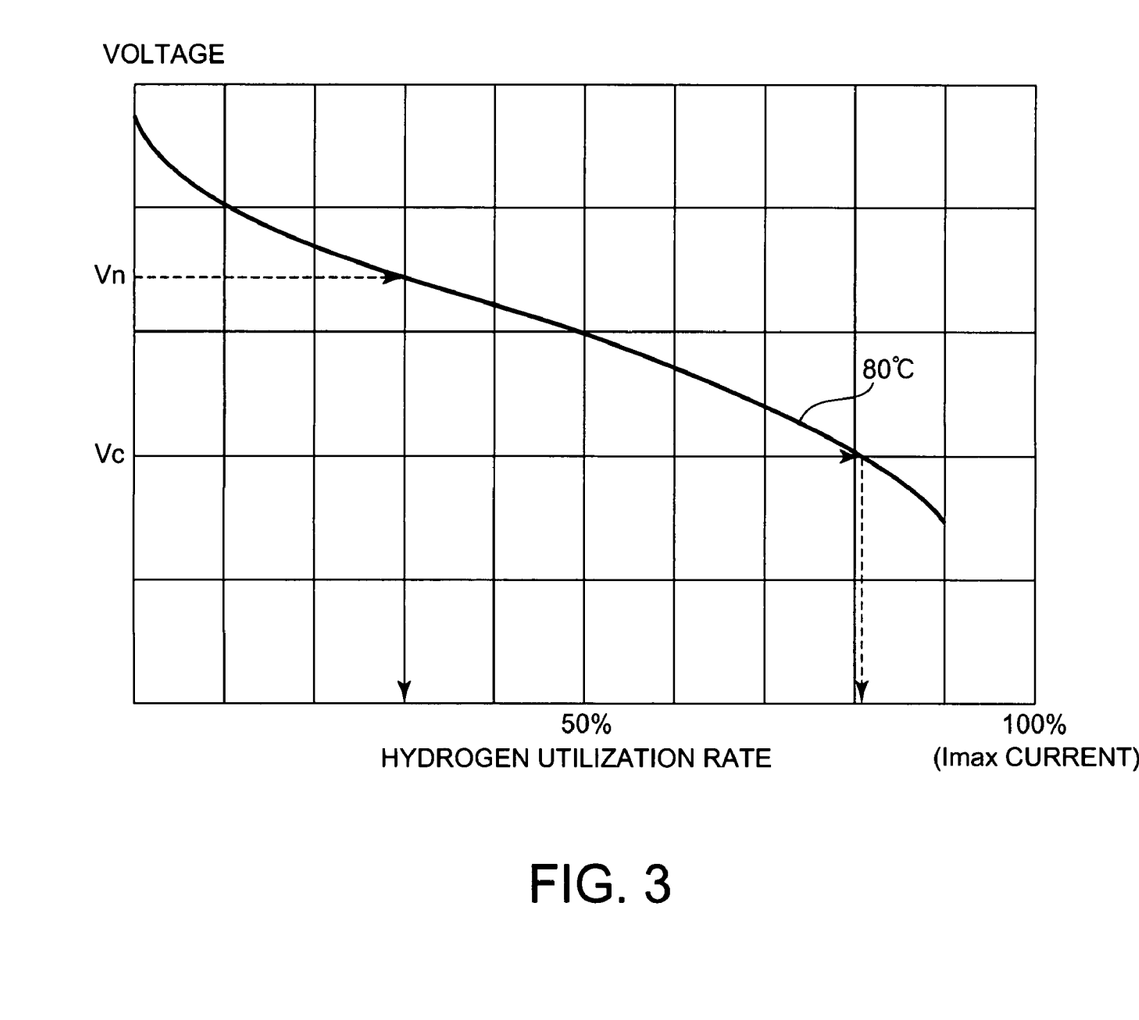
FIG. 3 is a graph showing a relation between the output voltages of a generator unit and a hydrogen utilization rates.

FIG. 3 is a graph showing a relation between the output voltages of the generator unit 120 and hydrogen utilization rates.

As apparent from the graph representing the relation between the output voltages of the generator unit 120 and the hydrogen utilization rates (a characteristic when a cell temperature is 80° C.), which is shown in FIG. 3, for example, when the generator unit 120 is generating electricity at an output voltage of Vc, the hydrogen utilization rate is approximately 81%, and the offgas contains only the residual hydrogen of 19%. On the other hand, when the generator unit 120 generates electricity at an output voltage of Vn, the hydrogen utilization rate becomes 30%, and 70% of hydrogen remains in the offgas.

That is, if the hydrogen utilization rate falls by lowering the generated electricity output of the generator unit 120, the quantity of the reacting hydrogen inevitably decreases, and the quantity of the oxygen consumption of the generator unit 120 also falls consequently. Moreover, due to the decrease, the air quantity required by each of the CO remover 105, the methanol catalyst combustor 109 and the offgas catalyst combustor 110 also decreases.

Therefore, the air quantity to be supplied to each unit of the fuel cell system 200 which requires air introduction (the CO remover 105, the methanol catalyst combustor 109, the offgas catalyst combustor 110, and the generator unit 120) may be suitably controlled, that is, it may be controlled to be approach a suitable quantity necessary for the reaction (bare minimum of quantity). Since the necessary air quantity decreases especially at the time of lowering the generated electricity output, it is possible to lower the drive voltage of the air pump P2 to decrease the supplying air quantity. Thereby, the air beyond necessity is not supplied to the generator unit (generator cell) while reducing power consumption, and the drying of the electrolyte film MEA of the generator unit can be prevented.

Figure 4:
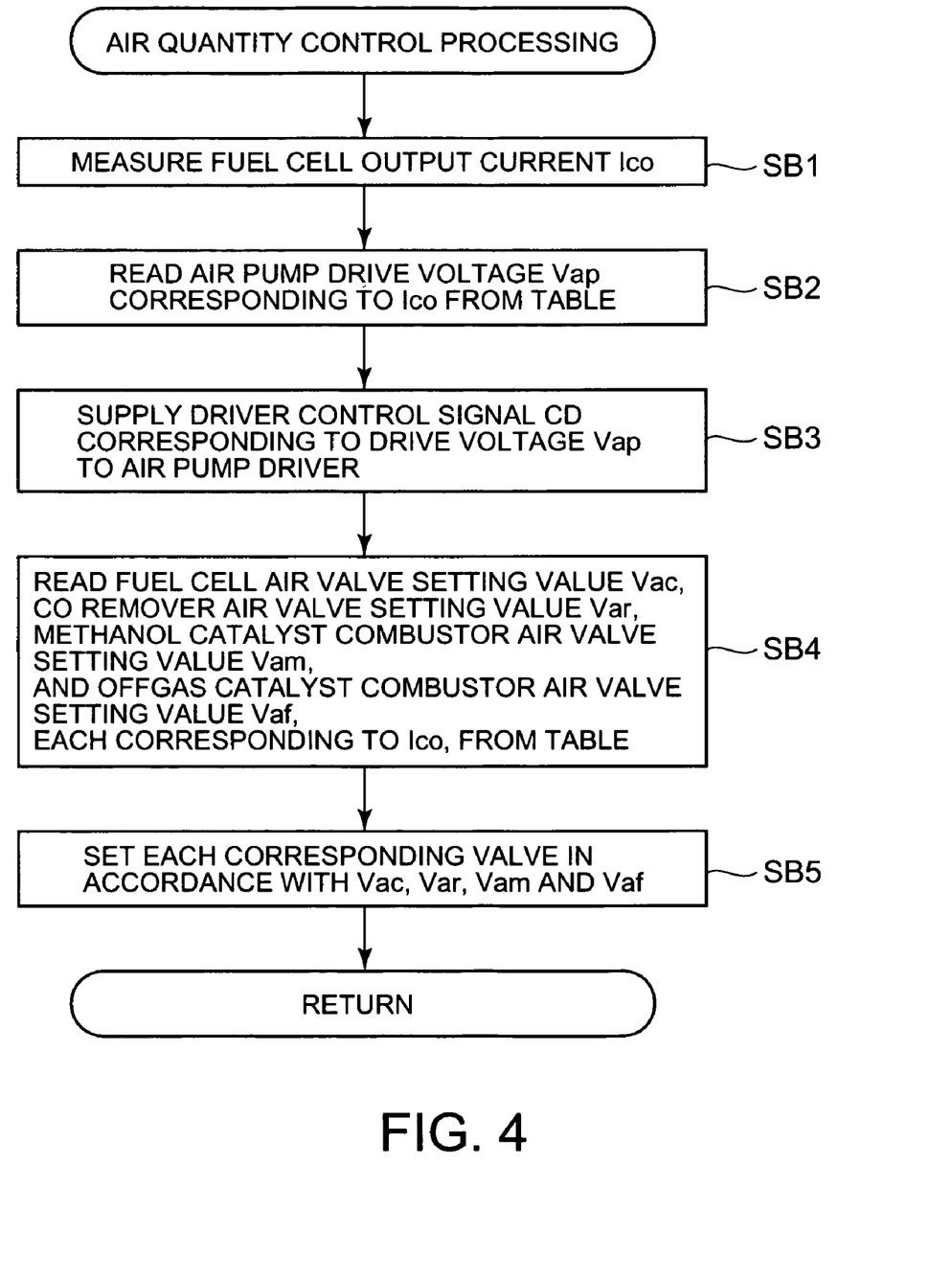
FIG. 4 is a flowchart showing the operation of the air quantity control processing in a second embodiment of the power source system according to the present invention.

Hereinafter, the air quantity control processing by an air quantity controller which embodies such operations is described. FIG. 4 is a flowchart showing the operation of the air quantity control processing in the second embodiment of the power source system according to the present invention.

The air quantity control processing shown in FIG. 4 is executed by an interruption at every predetermined time, for example, by the timer interrupter of the CPU of the control unit 130.

First, at interruption execution timing, the CPU of the control unit 130 executes the program of the air quantity control processing stored in the ROM and the like, and proceeds its processing to Step SB1 shown in FIG. 4. The CPU directly measures the output current value Ico of the generator unit 120 from the DC/DC converter 160 with a current measuring instrument, or the CPU converts the output of the DC/DC converter 160 to obtain the value of the output current value Ico of the generator unit 120 with a converter. Then, the CPU stores the value of the output current value Ico in the register Ico.

Subsequently, in Step SB2, the optimum air pump drive voltage Vap corresponding to the output current Ico stored in the register Ico is read out from an air pump drive table T2.

Here, the air pump drive table T2 is a table in which the experimentally obtained values of the air pump drive voltage Vap are saved, at which values the optimum air supplying quantity to the value of each output current Ico is produced, using various values of output currents Ico as reading addresses.

Subsequently, in Step SB3, the CPU supplies the driver control signal CD corresponding to the air pump drive voltage Vap obtained at Step SB2 mentioned above to the driver D2 of the air pump P2. Thereby, the air pump P2 is set so as to produce the optimum air supplying quantity.

Subsequently, in Step SB4, each of setting values corresponding to the output current Ico stored in the register Ico, a generator unit air valve setting value Vac, a CO remover air valve setting value Var, a methanol catalyst combustor air valve setting value Vam, and an offgas catalyst combustor air valve Vaf are read out from a valve drive table T3.

Here, the valve drive table T3 is a table in which the experimentally obtained valve setting values Vas, Var, Vam and Vaf are saved, at which the valves supplies the optimum air quantities to each unit of the fuel cell system 200 requiring air introduction (the generator unit 120, the CO remover 105, the methanol catalyst combustor 109 and the offgas catalyst combustor 110) to the value of each output current Ico, using the various values of output currents Ico as reading addresses.

Subsequently, the processing proceeds to Step SB5, and the valve drive signal VD is generated corresponding to each of the valve setting values Vac, Var, Vam and Vaf read at Step SB4 mentioned above. Then, the generated valve drive signal VD is supplied to each of the corresponding valves V4-V7, and completes the processing. Thereby, each of the valves V4-V7 is adjusted to supply the optimum air quantity (bare minimum).

By repeatedly executing the air quantity control processing described above every fixed period by the timer interrupter, the air quantity supplied to each unit of the fuel cell system 200 which requires air introduction (the CO remover 105, the methanol catalyst combustor 109, the offgas catalyst combustor 110 and the generator unit 120) is set as a suitable quantity (bare minimum of quantity) necessary for the reaction of each unit according to the output current Ico of the generator unit 120. In particular, since the necessary air quantity decreases at the time of lowering the generated output, the drive voltage of the air pump P2 can be lowered to decrease the air supplying quantity. Thereby, power consumption can be reduced, and the improvement in the energy efficiency for the whole system can be achieved as a result by fuel conservation, and a long period of operation can be enabled. Furthermore, since the air more than necessary is not supplied to the generator unit (generator cell), it is also possible to prevent drying of the electrolyte film MEA of the generator unit.

Incidentally, although only the air quantity control processing is performed in the present embodiment, the present invention is not limited to this embodiment. An aspect of also using the offgas control processing by the first embodiment described above may be used together with the air quantity control processing. In that case, it becomes possible to control the temperature of the reactor unit to be stably constant within dealing with load changes, while enabling the long period of operation by the improvement in energy efficiency of the whole system by fuel conservation and the prevention of the drying of the electrolyte film of the generator unit (generator cell).

What is claimed is:

1. A power source system, comprising:
   a chemical reaction unit which receives a supply of fuel for power generation to produce a gas for power generation;
   a generator unit which receives a supply of the gas for power generation, reacts a part of the gas for power generation to generate power, and ejects an unreacted part of the gas for power generation as an offgas;
   a heating apparatus, provided in the chemical reaction unit, which receives a supply of the offgas and a fuel for combustion, and sets the chemical reaction unit to a predetermined temperature by a heat quantity generated by a combustion reaction using a combustion component in the offgas and the fuel for combustion;
   a flow meter which measures a flow rate of the gas for power generation supplied to the generator unit;
   a calculator which calculates a residual hydrogen quantity of the combustion component in the offgas based on a value of the flow rate of the gas for power generation supplied to the generator unit, and a value of power generated by the generator unit;
   a supply quantity adjuster which adjusts a quantity of the fuel for combustion to be supplied to the heating apparatus; and
   a controller which controls the heat quantity generated by the heating apparatus by controlling the supply quantity adjuster;
   wherein the controller calculates a difference value between (i) a value of the residual hydrogen quantity obtained by the calculating of the residual hydrogen quantity by the calculator and (ii) a previous value of the residual hydrogen quantity obtained by the calculating of the residual hydrogen quantity by the calculator, and the controller controls the supply quantity adjuster based on a setting value of the supply quantity adjuster corresponding to the difference value so that a next difference value becomes zero.

2. The power source system according to claim 1, wherein the heating apparatus comprises a first heating unit which receives the supply of the offgas to generate a heat quantity by a combustion reaction using the combustion component in the offgas, and a second heating unit which receives a supply of the fuel for combustion to generate a heat quantity by the combustion reaction of the combustion component in the fuel for combustion; and
   wherein the controller controls the heat quantity generated by the second heating unit according to the quantity of the combustion component in the offgas, the quantity being calculated by the calculator.

3. The power source system according to claim 1, further comprising an air quantity controller which controls an air quantity supplied to the generator unit, the chemical reaction unit, and each unit of the heating apparatus which requires air introduction, according to a change of the value of the power generated by the generator unit so that the air quantity is close to a bare minimum quantity.

4. The power source system according to claim 1, wherein the fuel for combustion comprises the fuel for power generation.

5. The power source system according to claim 1, wherein the fuel for power generation is a hydrocarbon material containing a hydrogen atom, and wherein the chemical reaction unit is equipped with a reforming unit which at least generates a gas including a specific fuel component containing hydrogen as the gas for power generation from the fuel for power generation by a predetermined catalytic reaction.

6. The power source system according to claim 5, wherein the chemical reaction unit is further equipped with a by-product removing unit which removes a by-product produced by the catalytic reaction.

7. The power source system according to claim 5, wherein the generator unit is equipped with a fuel cell which generates the power by an electrochemical reaction using the gas for power generation.

8. The power source system according to claim 5, wherein the combustion component contains hydrogen.

9. The power source system according to claim 5, wherein the calculator comprises:
   a section for calculating a hydrogen quantity contained in the gas for power generation from the value of the flow rate of the gas for power generation supplied to the generator unit, the value being measured by the flow meter; and
   a section for calculating a quantity of the hydrogen in the offgas based on the calculated value of the hydrogen contained in the gas for power generation and a value of a hydrogen utilization rate according to a generated power in the generator unit.

10. The power source system according to claim 1, further comprising a voltage converter which converts an output power of the generator unit into an output voltage to supply the output voltage to a load.

11. The power source system according to claim 10, wherein the generator unit controls a quantity of power generated according to a change of required power based on an operation state of the load.

12. The power source system according to claim 10, further comprising a current measuring instrument which measures an output current value of the generator unit through the voltage converter, wherein the calculator calculates the quantity of the combustion component in the offgas based on a quantity of the flow rate of the gas for power generation measured by the flow meter and the output current value of the generator unit measured by the current measuring instrument.

13. The power source system according to claim 10, further comprising a converter which converts an output of the voltage converter into an output current value of the generator unit,
wherein the calculator comprises a section for calculating the quantity of the combustion component in the offgas based on the value of the flow rate of the gas for power generation measured by the flow meter and the output current value of the generator unit calculated by the converter.

14. A control apparatus in a power source system including: a chemical reaction unit which receives at least a supply of fuel for power generation to produce a gas for power generation; a generator unit which receives the gas for power generation, reacts a part of the gas for power generation to generate power, and ejects an unreacted part of the gas for power generation as an offgas; and a heating apparatus which receives a supply of the offgas and a fuel for combustion, and sets the chemical reaction unit to a predetermined temperature by a heat quantity generated by a combustion reaction using a combustion component in the offgas and the fuel for combustion, the control apparatus comprising:
a flow meter which measures a flow rate of the gas for power generation supplied to the generator unit;
a calculator which calculates a residual hydrogen quantity of the combustion component in the offgas based on a value of the flow rate of the gas for power generation, and a value of power generated by the generator unit;
a supply quantity adjuster which adjusts a quantity of the fuel for combustion to be supplied to the heating apparatus; and
a controller which controls the heat quantity generated by the heating apparatus by controlling the supply quantity adjuster;
wherein the controller calculates a difference value between (i) a value of the residual hydrogen quantity obtained by the calculating of the residual hydrogen quantity by the calculator and (ii) a previous value of the residual hydrogen quantity obtained by the calculating of the residual hydrogen quantity by the calculator, and the controller controls the supply quantity adjuster based on a setting value of the supply quantity adjuster corresponding to the difference value so that a next difference value becomes zero.

15. The control apparatus according to claim 14, wherein the fuel for power generation is a hydrocarbon material containing a hydrogen atom, and wherein the calculator comprises:
a section which calculates a quantity of hydrogen contained in the gas for power generation according to a value of the flow rate of the gas for power generation supplied to the generator unit; and
a section which calculates a quantity of hydrogen in the offgas based on the calculated value of the hydrogen contained in the gas for power generation and a value of a hydrogen utilization rate according to a generated power in the generator unit.

16. The control apparatus according to claim 14, further comprising an air quantity controller which controls an air quantity supplied to the generator unit, the chemical reaction unit, and each unit of the heating apparatus which requires air introduction, according to the value of the power generated by the generator unit so that the air quantity is close to a bare minimum quantity.

17. A control method of a power source system including: a chemical reaction unit which receives a supply of fuel for power generation to produce a gas for power generation; a generator unit which receives a supply of the gas for power generation, reacts a part of the gas for power generation to generate power, and ejects an unreacted part of the gas for power generation as an offgas; a heating apparatus which receives a supply of the offgas and a fuel for combustion, and sets the chemical reaction unit to a predetermined temperature by a heat quantity generated by a combustion reaction using a combustion component in the offgas and the fuel for combustion; and a supply quantity adjuster which adjusts a quantity of the fuel for combustion to be supplied to the heating apparatus, the method comprising:
calculating a residual hydrogen quantity of the combustion component in the offgas based on a flow rate of the gas for power generation supplied to the generator unit, and a value of power generated by the generator unit; and
controlling the heat quantity generated by the heating apparatus by calculating a difference value between (i) a value of the residual hydrogen quantity obtained by the calculating of the residual hydrogen quantity and (ii) a previous value of the residual hydrogen quantity obtained by the calculating of the residual hydrogen quantity, and controlling the supply quantity adjuster based on a setting value of the supply quantity adjuster corresponding to the difference value so that a next difference value becomes zero.

18. The control method according to claim 17, wherein calculating the quantity of the combustion component in the offgas comprises:
calculating a quantity of hydrogen contained in the gas for power generation according to a value of the flow rate of the gas for power generation supplied to the generator unit; and
calculating a quantity of hydrogen in the offgas based on a value of a hydrogen utilization rate according to a generated power in the generator unit, and a calculated quantity of hydrogen contained in the gas for power generation.

19. The control method according to claim 17, further comprising:
controlling an air quantity supplied to the generator unit, the chemical reaction unit, and each unit of the heating apparatus which requires air introduction, according to the value of the power generated by the generator unit so that the air quantity is close to a bare minimum quantity.

* * * * *